United States Patent
Kim et al.

(10) Patent No.: US 9,830,609 B1
(45) Date of Patent: *Nov. 28, 2017

(54) ACCESS TO AN EXCLUSIVE VIRTUAL SECTION OF AN ONLINE GAME BASED ON PAST SPENDING BEHAVIOR

(71) Applicant: KABAM, INC., San Francisco, CA (US)

(72) Inventors: John Kim, San Francisco, CA (US); Clive Henrick, San Francisco, CA (US); Joshua Morris, San Francisco, CA (US)

(73) Assignee: Kabam, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/464,173

(22) Filed: Mar. 20, 2017

Related U.S. Application Data (63) Continuation of application No. 13/940,159, filed on Jul. 11, 2013, now Pat. No. 9,623,335.

(51) Int. Cl.
| | |
|---|---|
| *G06Q 30/02* | (2012.01) |
| *G06Q 20/12* | (2012.01) |
| *A63F 13/85* | (2014.01) |
| *A63F 13/79* | (2014.01) |
| *A63F 13/67* | (2014.01) |

(52) U.S. Cl.
CPC ......... *G06Q 30/0209* (2013.01); *A63F 13/67* (2014.09); *A63F 13/79* (2014.09); *A63F 13/85* (2014.09); *G06Q 20/123* (2013.01); *G06Q 30/0222* (2013.01); *G06Q 30/0224* (2013.01)

(58) Field of Classification Search
CPC .......... A63F 13/67; A63F 13/79; A63F 13/85; G06Q 30/0219; G06Q 30/0224; G06Q 30/0222
See application file for complete search history.

(56) References Cited

U.S. PATENT DOCUMENTS

| | | | |
|---|---|---|---|
| 6,606,602 B1 | 8/2003 | Kolls | |
| 8,090,618 B1* | 1/2012 | Chu | G06Q 30/0209 |
| | | | 705/14.12 |
| 8,277,324 B2 | 10/2012 | Herrmann | |
| 8,328,642 B2 | 12/2012 | Mosites | |
| 2006/0111175 A1* | 5/2006 | Walker | G07F 17/32 |
| | | | 463/21 |
| 2006/0205461 A1 | 9/2006 | LaRocca | |
| 2007/0282695 A1* | 12/2007 | Toper | G06Q 30/0603 |
| | | | 705/26.81 |
| 2008/0220876 A1* | 9/2008 | Mehta | G06Q 30/08 |
| | | | 463/42 |
| 2009/0247282 A1* | 10/2009 | Cheng | A63F 13/12 |
| | | | 463/25 |

(Continued)

*Primary Examiner* — Dmitry Suhol
*Assistant Examiner* — David Duffy
(74) *Attorney, Agent, or Firm* — Sheppard Mullin Richter & Hampton LLP (57) ABSTRACT

This disclosure relates to a system and methodology for obtaining information associated with spend history of a first user in connection with playing an online game and processing the information associated with the spend history to assign the user spend parameter value to the first user which may be further used to provide selective access to an exclusive virtual section associated with an online game when the user spend parameter value meets the spend threshold.

18 Claims, 2 Drawing Sheets

(56) References Cited

U.S. PATENT DOCUMENTS

| | | | |
|---|---|---|---|
| 2011/0107239 A1* | 5/2011 | Adoni | A63F 13/12 |
| | | | 715/757 |
| 2011/0196754 A1 | 8/2011 | Proud | |
| 2011/0264562 A1* | 10/2011 | Borst | G06Q 30/02 |
| | | | 705/27.1 |
| 2012/0215608 A1 | 8/2012 | Paulos | |
| 2012/0215667 A1 | 8/2012 | Ganz | |
| 2012/0289346 A1* | 11/2012 | Van Luchene | A63F 13/85 |
| | | | 463/42 |
| 2013/0124337 A1* | 5/2013 | Gaucas | G06Q 30/0201 |
| | | | 705/14.67 |
| 2013/0324259 A1* | 12/2013 | McCaffrey | A63F 13/79 |
| | | | 463/42 |
| 2014/0100020 A1* | 4/2014 | Carroll | A63F 13/12 |
| | | | 463/25 |
| 2014/0228097 A1 | 8/2014 | Kawamoto | |

* cited by examiner

ACCESS TO AN EXCLUSIVE VIRTUAL SECTION OF AN ONLINE GAME BASED ON PAST SPENDING BEHAVIOR

FIELD OF THE DISCLOSURE

This disclosure relates to a system and method for selectively providing access to an exclusive virtual section of an online game based on past spending behavior of the user.

BACKGROUND

In "free-play" online games, access to a game is free. The user can play the game, if they so choose, without spending any money. Gameplay to simply progress in level and/or power is typically called "grinding." If a player fishes to forego "grinding", they can purchase virtual items, such as power ups, which will make their progression more rapid and/or efficient.

In free-to-play games, a small segment of the users spend a surprisingly large amount of money, most payers spend some money, and a few active players spend little or no money. By allowing every user, no matter the difference in the particular user's spending level, to view and access virtual items or value from the same virtual store section, an opportunity is lost to extract additional value from users inclined to spend relatively more money. Additionally, when the users that are less inclined to spend money are made aware of the ability of other users to spend more to get ahead in the game, users that spend less may be discouraged and thus driven out of the game.

SUMMARY OF THE DISCLOSURE

One aspect of the, disclosure relates to a system configured to provide selective access to an exclusive virtual section of an online gaming system. In some implementations, spending history may be characterized by a user spend parameter value. The user spend parameter value may be compared with a spend threshold to determine which users should to provided with access to an exclusive virtual section of the online game. An implementation of the exclusive virtual section may include a shop interface, which presents the selected user with exclusive offers. Exclusive offers include offers to purchase virtual items or value pricing. The exclusive offers may be used to advance in the online game or for other purposes. Making certain offers exclusive to users based on past spending history may facilitate presentation of high-end, or expensive virtual items to users that have demonstrated an appetite for making purchases at a higher level. This may enhance the in-game experience for such users by giving them access to the types of virtual items they may wish to purchase. Restricting such offers may enhance the in-game experience for users that do not see these offers, as they may keep such users from feeling frustrated and/or overwhelmed by the amount of money that other users are spending in the game.

In exemplary implementations, providing access to an exclusive virtual section based on spending history may be performed by processors executing computer program modules. In some implementations, the system may include on or more servers. The server(s) may be configured to communicate with one or more client computing platforms according to a client/server architecture. The users may access the system via the client computing platforms, for instance, to engage in one or more games, The server(s) may be configured to execute one or more computer program modules to provide one or more games to users (or players). The computer program modules may include one or more of a game module, a user profile management module, a shop module, an exclusive virtual access module, and/or other modules. It is noted that the client computing platforms may include one or more computer program modules that are the same as or similar to the computer program modules of the server(s) to facilitate individualized content made available to the users of online games.

The game module may be configured to execute an instance of an online game, and to implement the instance of the online game to facilitate participation of users in the online game. The game module may be configured to implement access to an exclusive virtual section determined for individual users such that the access to the exclusive virtual section is selectively implemented in the instance of the online game for a first user.

The user profile management module may be configured to manage user profiles associated with the users. The user profiles include user spend parameter values for the users characterizing past spending histories of the users within the game. The user profiles include a first user profile for a first user. The first user profile includes a first user spend parameter value characterizing a past spending history for the first user in the game. With respect to such spending, various parameters may be tracked and monitored by the user profile management module. Such parameters include, for example, a user lifetime spend history parameter, a user periodic spend history parameter, spend velocity (money spent per unit time), typical spend profile(s) (average spending at different points in accounts on previous games), total spend by game or in the aggregate and others as described herein.

The shop module may be configured to present offers to sell virtual items for use in a game to users through a shop interface. The shop module may be configured such that the offers to sell virtual items include one or more exclusive offers that are only presented to selected users. The selected users may be deemed as being part of an exclusive club in the online game community.

The exclusive virtual access module may be configured to determine which users should be presented the one or more exclusive offers by the shop module such that a determination as to whether the first user should be presented the one or more exclusive offers by the shop module is made based on a comparison of the first user spend parameter value with a spend threshold. In certain implementations, user spend history determinations are made, and a user spend parameter value based thereupon is assigned to a user based on the one or more of the spending parameters noted herein.

In certain implementations, access by a first user to the exclusive virtual section including the shop interface is imperceptible to a second user or other users during gameplay. Implementation of the access to the exclusive virtual section, such as the shop interface, is perceptible to the first user or a selected user.

One aspect of the disclosure relates to computer-implemented method for selectively providing access to an exclusive virtual section of an online gaming system based upon a user spend parameter value. The method may be implemented in a computer system that includes one or more physical processors and storage media storing machine-readable instructions. The method includes obtaining information associated with spend history of a first user in connection with playing an online game and processing the information associated with the spend history to assign the user spend parameter value to the first user. The method further includes determining when the user spend parameter value meets a spend threshold and allowing access to the exclusive virtual section when the user spend parameter value meets the spend threshold.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended a definition of the limits of the invention. As used in the specification and in the claims, the singular form of "a", "an", and "the" include plural references unless the context clearly dictates otherwise.

DETAILED DESCRIPTION

Figure 1:
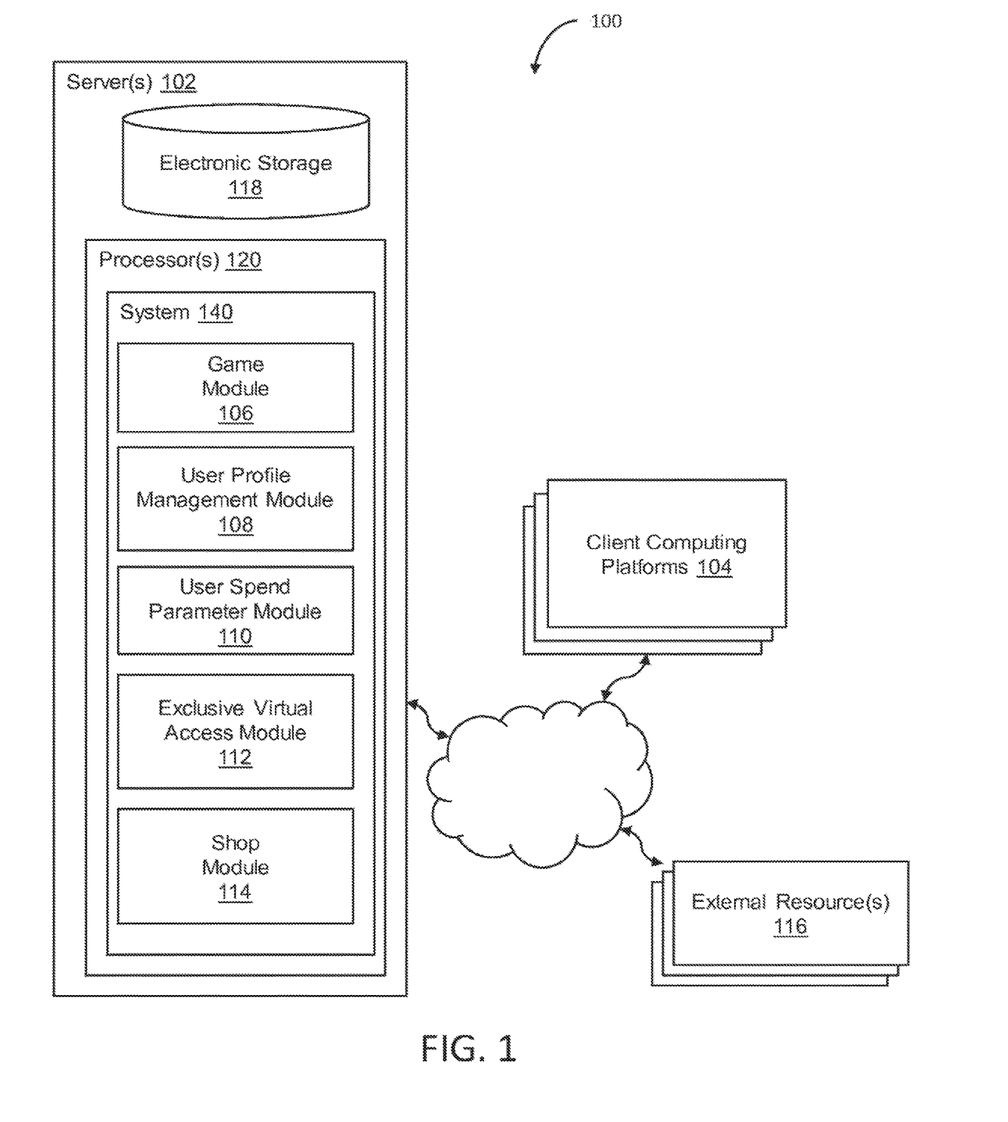
FIG 1. illustrates a system for providing access to an exclusive virtual section of an online gaming system, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program modules. The computer program modules may include one or more of a game module 106, a user profile management module 108, a user spend parameter module 110, an exclusive virtual access module 112, a shop module 114, and/or other modules. As noted, the client computing platform(s) 104 may include one or more computer program modules that are the same as or similar to the computer program modules of the server(s) 102 to facilitate in-game actions.

The computer program modules may make up a system 140, which is configured to provide select users with access to an exclusive virtual section of an online gaming system. An implementation of the system includes one or more of a game module 106, a user profile management module 108, a user spend parameter module 110, an exclusive virtual access module 112, a shop module 114, and/or other modules.

In an implementation, advantage of providing select access to a separate exclusive virtual section or a very important person (VIP) store section may be that it prevents much of the negative publicity that comes with introducing and featuring relatively ultra-expensive virtual items for use in the online game. An implementation of providing the select access may also not discourage lower spenders from paying to advance in the game. In an implementation, the exclusivity of the store section may also provide a psychological benefit to users that are high spenders and may provide an incentive to some medium-sized spenders to hit relevant thresholds.

In an implementation, the game module 106 may be configured to execute an instance of an online game, and to implement the instance of the online game to facilitate participation of users in the online game. The game module 106 may be further configured to implement access to an exclusive virtual section, such as may be implemented by shop module 114. The exclusive virtual section may be determined for individual users such that the access to the exclusive virtual section is implemented in the instance of the online game for user.

The game module 106 may be configured to execute an instance of an online game to facilitate presentation of the online game to users. The game module 106 may be configured to implement in-game actions in the instance of the game, in response to action requests for the in-game actions by the users.

The game may be provided via virtual space, and may include a plurality of resource types and/or maps. An instance of the virtual space may be executed by computer modules to determine views of virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of a plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communication may include one or more of textual chat, instant messages, private messages, voice communications, and/or other communications. Communications may be received and entered by the users via their respective client computing platforms 104. Communications may be routed to and from the appropriate users through server(s) 102. In implementations the game module 106 may also be configured to implement the access to the exclusive virtual section determined for the individual users as described herein.

The user profile management module 108 may be configured to manage user profiles of the users. The user profiles may include user spend parameter values for the users. The spend parameter values characterize past spending histories of the users within at least the game. The user profiles may include a first user profile of a first user. The first user profile may include a first user spend parameter value characterizing a past spending history of the first user in at least the game. Each user may be associated with their own respective past spending history and user spend parameter value.

The shop module 114 may be configured to present offers to sell virtual items for use in the game to users through a shop interface. The shop module 114 may be configured such that the offers to sell virtual items include one or more exclusive offers that are only presented to selected users. In an implementation, the shop interface provides for purchasing of the one or more exclusive offers. For example, a virtual item includes a resource that is used within the online game, such as a virtual good or currency. In an implementation, the shop interface may be a pop up window interface that is triggered by events during the game. In another implementation, the user may receive a notice of the existence of exclusive offers and the user may initiate the viewing of the exclusive offer presentation. There exists numerous implementations for presenting the exclusive offer to the user.

For example, the implementation of the access to the exclusive virtual section including the shop interface may be imperceptible to a second user during gameplay. For example, implementation of the access to the exclusive virtual section including the shop interface may be perceptible to the first user during gameplay. For example, implementation of the access to the exclusive virtual section including the shop interface may be imperceptible to users other than the first user during gameplay.

The exclusive virtual access module 112 may be configured to determine which users should be presented the one or more exclusive offers by the shop module 114. A determination as to whether the first user should be presented the one or more exclusive offers by the shop module 114 may be based on a comparison of the first user spend parameter value with a spend threshold.

The user spend parameter module 110 may be configured to determine the user spend parameter value based on the past spending history. For example, the user spend parameter value may be a user lifetime spend history parameter or a user periodic spend history parameter. For example, the periodic spend history parameter may be a past purchasing amount that the user spent per a unit time. An example of a unit time includes an one or more of the last hour, last day, last week, last month, etc. or the last day after the user added value to the user's account. For example, the user lifetime spend history parameter may be the amount spent by the user for a particular account or character in a single game or all characters in one or more games, etc.

In an implementation, the user spend parameter value comprises one or more parameters associated with a spend velocity profile associated with the first user. In other implementations, the unit time may be used to determine a spend velocity profile per the user account. For example, the online game module may keep track of when the user spends at a fast rate or spend velocity. For example, the spend velocity may be highest when the user reaches a certain level or a time within a level, such as the last actions before reaching a new level in the online game. The online game module may keep track of all the information about the user, especially when the spend velocity is determined to be over a particular level. The user profile management module 108 or the user spend parameter module 110 may keep track of the spend history of the user, For example, the user profile management module 108 may be configured to obtain and maintain information about the spend history of a user. The user profile management module 108 may also be configured to determine a user spend parameter value. In an implementation, a user spend parameter module 110 may execute the functionality for determining the user spend parameter value alone or in combination with the user profile management module 108. For example, when the amount of information monitored by the user profile management module 108 is great, then the user spend parameter module 110 may be used to distribute some of the processing. The distribution of the processing described herein may configured according to a specific hardware and software implementation of a system that implements the disclosure described herein. As such, when the term user spend parameter module 110 is used herein it may be replaced with the more general user profile management module 108. As stated above, FIG. 1 illustrates an implementation of the system described herein and, as such, is not to be limiting to the disclosure.

Referring back to FIG. 1, the user profile management module 108 or the user spend parameter 110 module may be configured to track historical spend information associated with a user. In an implementation, user spend parameter module 110 is configured to monitor and assess spend history information for users in connection with game play for one or more games. This may include, for example, the subject game which is to provide select users with access to the exclusive virtual section as described herein.

In an implementation, historical spend information associated with other games either alternatively or in addition to the subject game may be considered. For example, the user spend parameter value associated with the first user may be associated only with the first user's interaction with the online game. For example, the user spend parameter value associated with the first user may be associated with the first user's interaction with one or more games other than the online game. For example, the user spend parameter value associated with the first user may be associated with the first user's interaction with the online game and with one or more games other than the online game. In another implementation, the spend history associated with the user for purchases other than with respect to games may also be considered.

Referring back to FIG. 1, the user profile management module 108 or the user spend parameter module 110 may monitor and track various characteristics associated with the user's spend history. For example, spend velocity may be tracked and considered. Spend velocity may equate to the amount of money spent by the user per unit time. In an implementation, the user spend parameter module 110 may use the spend velocity to an assess an average spending velocity by the user at different points in time during game play. Alternatively or in addition, this may equate to average spending by the user at content driven points in one or more games. Examples of this may include, average spend during quest related in-game activities, average spend during player to player battles, etc. In other implementations, the user spend parameter module 110 may determine total spend, either on a game by game basis or total game spend in the aggregate, or both to generate a user spend parameter value, which may be compared to a respective spend threshold as described herein.

In an implementation, the user spend parameter module 110 may generate a user spend parameter value, based on one or more characteristics, as described above. This user spend parameter value may then be used by the exclusive virtual access module 112, as described below, to implement access to an exclusive virtual section of the online game. Alternatively, in other implementations, the user spend parameter module 110 may generate a more detailed "spending pattern profile" which represents the various spend history patterns associated with a user. In this case, this profile may be mapped to one or more particular user spend parameter values as described below so that multiple levels of access are adjusted based on one or more aspects of the user spend characteristics.

In this disclosure, previous spending histories associated with users of online games, are detected, and various game characteristics relating to the game play and access to virtual items that may assist game play may be adjusted based on this information. Accordingly, implementations may be configured for determination and detection of previous spending characteristics of users such as spending velocity which is represented as money spent per unit time during game play. Other implementations may be configured such that spending history determination takes into account a typical spend profile of a user. In this case, average spending at different points of game play is monitored and assessed. For example, these points of game play may be related to temporal progress during game play or in the alternative, they may be driven by specific content which is active and/or available during gameplay.

In an implementation, the user spend parameter value comprises one or more parameters associated with a temporal historical spend profile associated with the first user. For example, the temporal historical spend profile characterizes spending at content driven points in the online game. A spend profile for the user may be monitored and tracked during game play. This may equate to an assessment of average spending by the user at different points in time during game play. Alternatively or in addition, this may equate to average spending by the user at content driven points in one or more games. Examples of this may include, average spend during quest related in game activities, average spend during player to player battles, etc. In other implementations, total spend, either on a game by game basis or total game spend in the aggregate, or both, may be considered. For example, the user spend parameter value may comprise one or more parameters associated with a total spend profile associated with the first user with respect to the online game. In other implementations, total spend history for the user, such as on an aggregate basis or on a game by game basis, may be tracked and assessed in order to make a determination concerning overall user spending history.

Implementations further provide access to an exclusive virtual section. The virtual section includes access to a shop module 114 that is configured to present offers to sell virtual items for use in the online game. In an implementation, the offers may be presented in a shop interface. The offers to sell virtual items include one or more exclusive offers that are only presented to selected users. A selected user may purchase an exclusively presented offer from the shop interface to progress further in the online game. For example, the exclusive offer may include the ability to execute a power of attacks, to provide resistance to attacks, to acquire speed and/or responsiveness of controlled units and/or spawn rates for units and/or resources as well as health recharge rates and other parameters.

In an implementation, an exclusive virtual access module 112 determines whether to provide a user with access to the exclusive virtual section depending upon whether the user has met a spend threshold. In an implementation, the exclusive virtual access module 112 compares a particular user spend parameter value with the associated spend threshold. For example, one type of user spend parameter value is determined by how much a user has spent during the lifetime of the user account. When the lifetime spend history parameter meets a respective spend threshold, the exclusive virtual access module 112 provides the user be with access to a virtual store.

In an implementation, the exclusive virtual access module 112 makes the virtual store visible only to the users that have met the particular spend threshold. In an implementation, the exclusive virtual access module 112 may associate each of the users that have met the particular spend threshold to a respective spend level. For example, the access to the exclusive virtual section may include different access levels based on a respective user spend parameter value. The shop module 114 may present exclusive offers that are associated with the particular spend level. For example, the exclusive offers associated with the different spend levels may be set to entice each of the different types of spenders to purchase at price points that have succeeded historically or that are determined to have succeeded by market or statistical research.

In an implementation, the exclusive virtual access module 112 provides access to the shop module 114. The shop module 114 is an implementation of access to the exclusive virtual section that comprises access to the shop interface including access to the purchase of virtual items at price ranges associated with a spend velocity profile. For example, exclusive virtual access module 112 may determine a user spend parameter value that is based upon a spend velocity profile as described above. The shop module 114 may provide access to the purchase of virtual items for use in the online game. The shop module 114 may present price ranges to the selected users based on the particular user's spend velocity profile. For example, a user with a high spend velocity profile may be provided with an exclusive offer for a virtual item at a particular price point or may be provided with an exclusive offer of a value pricing. In an implementation, access to the exclusive virtual section comprises access to value pricing. An implementation of value pricing includes sale prices for the virtual items or a discount rate or a bonus or a user reward program, etc. An implementation of value pricing includes changing the pricing or valuation of virtual currency. The price change may be based on payer bands, each may be determined by spend levels achieved based on the particular user spend parameter value of the respective user. Exclusive offers or value pricing may be a method of optimizing total payer conversion and overall revenue.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, and 114. Processor 120 may be configured to execute modules 106, 108, 110, 112, and 114 by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, and 114 are illustrated in FIG. 1 as being implemented within a single processing unit, in implementations in which processor 120 includes multiple processing units, one or more of modules 106, 108, 110, 112, and 114 may be implemented remotely from the other modules. The description of the functionality provided by the different modules 106, 108, 110, 112, and 114 described above is for illustrative purposes, and is not intended to be limiting, as any of modules 106, 108, 110, 112, and 114 may provide more or less functionality than is described. For example, one or more of modules 106, 108, 110, 112, and 114 may be eliminated, and some or all of its functionality may be provided by other ones of modules 106, 108, 110, 112, and 114. As another example, processor 120 may be configured to execute one or more additional modules that may perform some or all of the functionality attributed below to one of modules 106, 108, 110, 112, and 114.

Figure 2:
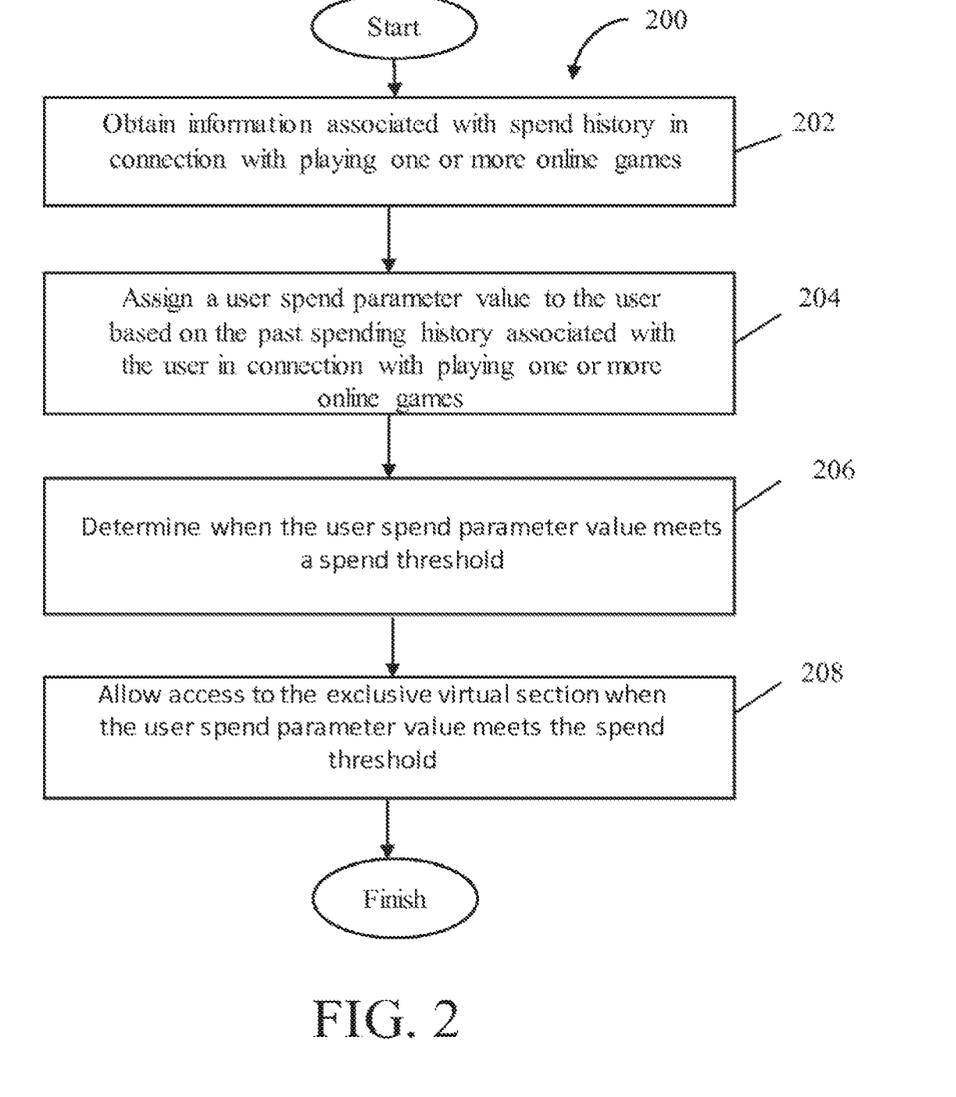
FIG. 2 illustrates a method for providing access to an exclusive virtual section of an online gaming system, in accordance with one or more implementations.

FIG. 2 illustrates a method for selectively providing access to an exclusive virtual section of an online gaming system based upon a user spend parameter value, in accordance with one or more implementations. For example, method 200 includes obtaining information associated with spend history of a first user in connection with playing an online game and processing the information associated with the spend history to assign the user spend parameter value to the first user. Method 200 further includes determining when the user spend parameter value meets a spend threshold and allowing access to the exclusive virtual section when the user spend parameter value meets the spend threshold. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information associated with the spend history associated with a user in connection with game play is obtained. In an implementation, the user spend parameter value comprises a user lifetime spend history parameter or a user periodic spend history parameter. In an implementation, spend velocity may be tracked and considered. This may equate to the amount of money spent by the user per unit time. In an implementation, as describe above, a unit of time may be the lifetime of the user account or game character. In another implementation the unit of time may be a periodic unit of time. In implementations, a typical spend profile for the user may be monitored and tracked. This may equate to an assessment of average spending by the user at different points in time during game play. Alternatively or in addition, this may equate to average spending by the user at content driven points in one or more games. Examples of this may include, average spend during quest related in game activities, average spend during player to player battles, etc. In other implementations, total spend, either on a game by game basis or total game spend in the aggregate, or both, may be considered.

In some implementations, a single user spend parameter value may be generated based on one or more of the above described characteristics. Alternatively, in other implementations, a more detailed "spending pattern profile" which represents the various spend history patterns associated with a user may be generated. Operation 202 may be performed by a user profile management module, in accordance with one or more implementations. User profile management module may be the same as or similar to user profile management module 108.

At an operation 204, based on the information received as a result of operation 202, the user is assigned a user spend parameter value which is indicative of the spend history determined in operation 202. Operation 204 may be performed by a user profile management module or a user spend parameter module or a combination of the two modules, in accordance with one or more implementations. User profile management module may be the same as or similar to user profile management module 108. User spend parameter module may be the same as or similar to user spend parameter module 110.

At an operation 206, the user spend parameter value associated with the user is used to determine whether the value meets a spend threshold. Operation 206 may be performed by an exclusive virtual access module, in accordance with one or more implementations. Exclusive virtual access module may be the same as or similar to exclusive virtual access module 112.

At an operation 208, access to an exclusive virtual section of the online game may be provided to a user that is associated with a user spend parameter value that meets a spend threshold. Operation 208 may be performed by an exclusive virtual access module 112, in accordance with one or more implementations. Exclusive virtual access module may be the same as or similar to exclusive virtual access module 112.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A game server configured to provide access to exclusive offers in an online game, wherein the access is provided to users that are associated with client computing platforms, wherein the users include a first user and a second user, wherein the game server comprises:
   one or more processors configured by machine-readable instructions to:
      execute an instance of the online game to facilitate presentation of the online game to the users on the client computing platforms by transmitting view information over a network to the client computing platforms, the view information causing the client computing platforms to display views of the online game;
      facilitate participation of the users in the on line game in response to information received over the network from the client computing platforms;
      determine user spend parameters for the users including a first user spend parameter for the first user, wherein the first user spend parameter value characterizes a spend velocity of the first user in at least the online game, wherein the spend velocity reflects an amount of currency spent per an amount of time;
      perform a comparison of the first user spend parameter value with a spend threshold; and
      responsive to the first user spend parameter value breaching the spend threshold, present, through a shop interface, an offer to sell one or more virtual items for use in the online game to the first user, wherein the offer is exclusive to the users having the user spend parameters that breach the spend threshold.

2. The game server of claim 1, wherein the shop interface is presented providing access to an exclusive virtual section in the online game, wherein the exclusive virtual section is presented via views of the online game to the first user via a client computing platform associated with the first user.

3. The game server of claim 2, wherein the one or more processors are further configured by machine-readable instructions to determine the first user spend parameter based on a spending history of the first user.

4. The game server of claim 2, wherein the one or more processors are further configured by machine-readable instructions to accept the offer to purchase the one or more virtual items via the shop interface.

5. The game server of claim 4, wherein the one or more virtual items include an ability within the online game.

6. The game server of claim 3, wherein the spending history includes a user lifetime spend history parameter or a user periodic spend history parameter.

7. The game server of claim 1, wherein the shop interface is hidden from the second user during gameplay.

8. The game server of claim 1, wherein the first user spend parameter value is associated with the first user's interaction with one or more games other than the online game.

9. The game server of claim 1, wherein the first user spend parameter value is associated both with the first user's interaction with the online game and with one or more games other than the online game.

10. A computer-implemented method for selectively providing access to exclusive offers in an online game, wherein the access is provided to users that are associated with client computing platforms, wherein the users include a first user and a second user, the method being implemented in a game server that includes one or more physical processors and storage media storing machine-readable instructions, the method comprising:

executing an instance of the online game to facilitate presentation of the online game to the users on the client computing platforms by transmitting view information over a network to the client computing platforms, the view information causing the client computing platforms to display views of the online game;

facilitating participation of the users in the online game in response to information received over the network from the client computing platforms;

determining user spend parameters for the users including a first user spend parameter for the first user, wherein the first user spend parameter value characterizes a spend velocity of the first user in at least the online game, wherein the spend velocity reflects an amount of currency spent per an amount of time;

performing a comparison of the first user spend parameter value with a spend threshold; and responsive to the first user spend parameter value breaching the spend threshold, presenting, through a shop interface, an offer to sell one or more virtual items for use in the online game to the first user, wherein the offer is exclusive to the users having the user spend parameters that breach the spend threshold.

11. The method of claim 10, wherein presenting the shop interface includes providing access to an exclusive virtual section in the online game, wherein the exclusive virtual section is presented via views of the online game to the first user via a client computing platform associated with the first user.

12. The method of claim 11, wherein determining the first user spend parameter is based on a spending history of the first user.

13. The method of claim 11, further comprising accepting of the offer to purchase the one or more virtual items via the shop interface.

14. The method of claim 13, wherein the one or more virtual items include an ability within the online game.

15. The method of claim 12, wherein the spending history includes a user lifetime spend history parameter or a user periodic spend history parameter.

16. The method of claim 10, wherein the shop interface is hidden from the second user during gameplay.

17. The method of claim 10, wherein the first user spend parameter value is associated with the first user's interaction with one or more games other than the online game.

18. The method of claim 10, wherein the first user spend parameter value is associated both with the first user's interaction with the online game and with one or more games other than the online game.

* * * * *